Jan. 8, 1935. A. O. RASMUSSEN 1,987,349
MEAT TENDERER AND METHOD OF TENDERING MEAT
Filed Sept. 24, 1932 2 Sheets-Sheet 1

A. O. RASMUSSEN INVENTOR.
BY Merrill M. Blackburn
ATTORNEY.

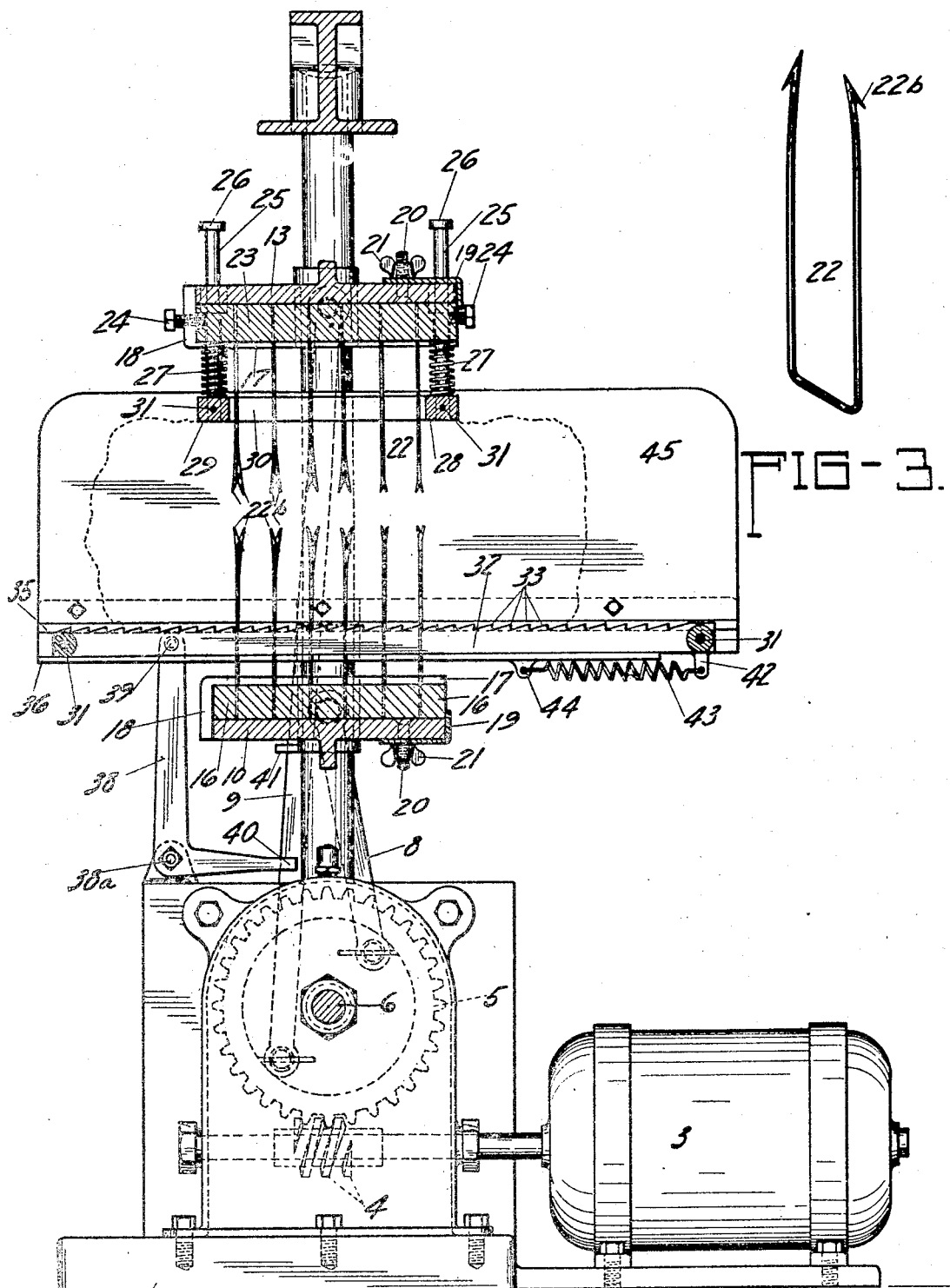

Patented Jan. 8, 1935

1,987,349

UNITED STATES PATENT OFFICE 1,987,349

MEAT-TENDERER AND METHOD OF TENDERING MEAT

Andrew O. Rasmussen, Davenport, Iowa

Application September 24, 1932, Serial No. 634,631

17 Claims. (Cl. 17—28)

The present invention relates to apparatus for and method of rendering meat tender and more readily edible and comprises among its objects to provide means whereby the tough fibers which make meat tough may be broken in the meat so that the muscle portions thereof will not be so thoroughly bound together as in natural condition; to provide means which is easy to operate and which is efficient for the purpose indicated; to provide means which can be readily disassembled for cleaning purposes and just as readily reassembled; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Fig. 2 is a vertical transverse section substantially along the broken plane indicated by the line 2—2, Fig. 1;

Fig. 3 is a detailed view of a sinew hook used in this machine.

Figure 1:
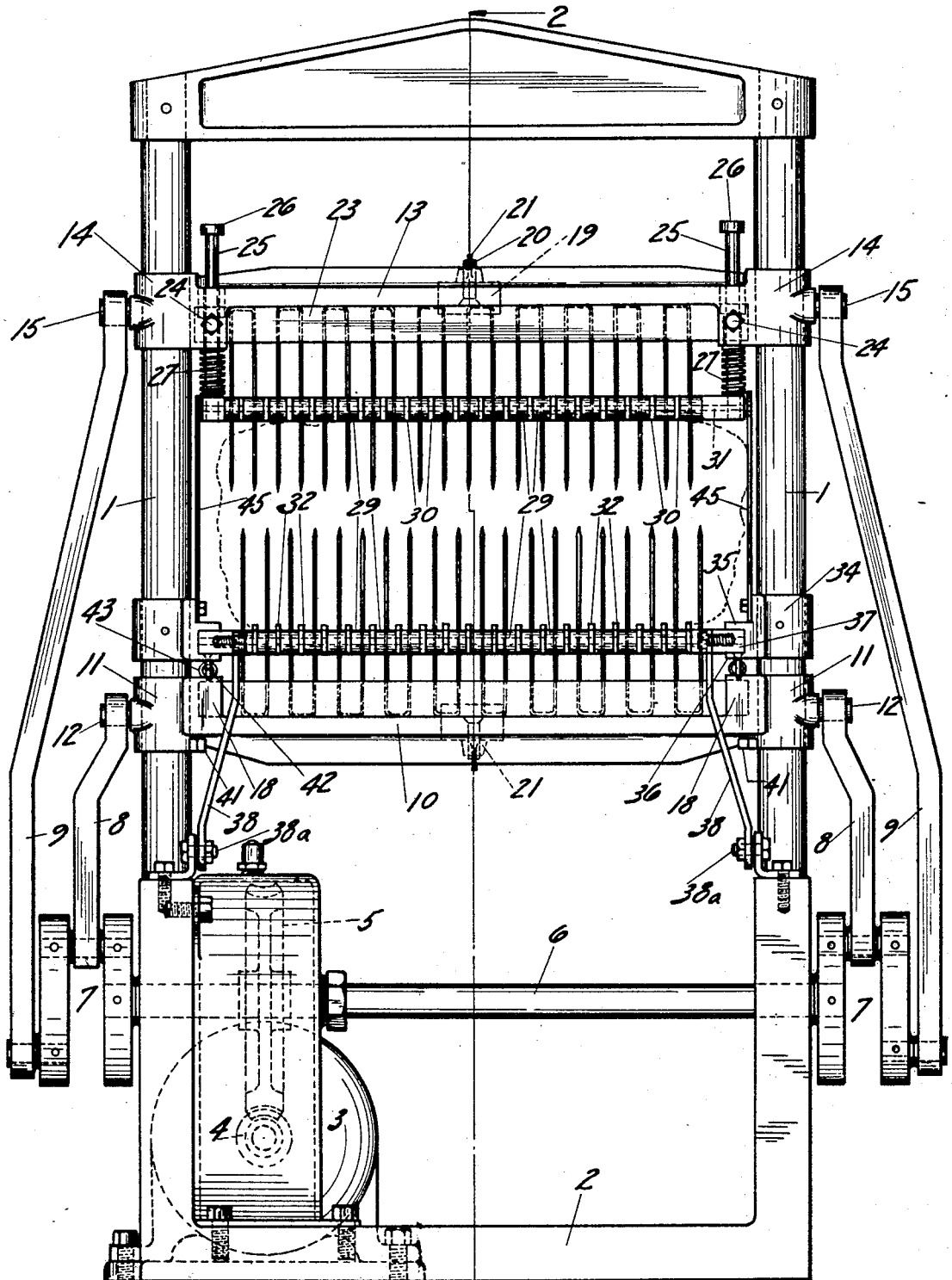
Fig. 1 is a front elevation of a structure embodying my present invention and capable of carrying out the improved method herein disclosed.

Essentially, this device comprises a supporting frame, a pair of plates reciprocable toward and from each other, a motor to reciprocate the plates, and sinew hooks carried by the plates to be inserted into and withdrawn from the meat to push or pull the sinew fibers so as to break them.

This structure will now be described in greater detail. A pair of upright posts 1 are supported by a base frame 2, which base carries a motor 3 upon whose shaft is mounted a worm 4 which meshes with a worm wheel 5 carried by a crank shaft 6. At the opposite ends of this crank shaft 6 are cranks 7 to which are connected the links 8 and 9. It will be obvious that as the crank shaft 6 is rotated, the links 8 and 9 will be reciprocated simultaneously in opposite directions and that anything connected with them will likewise be reciprocated in opposite directions.

A frame member 10 is provided at its ends with eyes or loops 11 which surround the posts 1 and are connected by means of the pins 12 with the links 8, the frame member thus being caused to reciprocate with the links 8. A second frame member 13 is provided with similar loops 14 which have pins 15 thereon, which pins are connected to the links 9, as is evident from Fig. 1. It is thus apparent that as the crank shaft 6 rotates the frame members 10 and 13 will be caused to reciprocate toward and from each other.

Detachably carried by the frame member 10 is a bed plate 16 which slides under the flanges 17 of the ends of the frame and abuts against flanges 18 which form continuations of the flanges 17. A latch member 19 is mounted on the bolt 20 and is held in adjusted position by means of the wingnut 21. When the bed plate 16 is shoved into place and the latching member 19 is secured by means of wingnut 21 with its end against the edge of the bed plate, the latter will be held rigidly with relation to member 10. Sinew hooks 22 are mounted in the bed plate 16 and are preferably of the pulling type, shown in Fig. 3. These sinew hooks may be as numerous as desired, so long as they do not interfere with each other in operation. The points illustrated in Fig. 3, which are of the pulling type, are denoted by the reference character 22b. By means of these the connective tissue which binds the muscle fiber together and makes the meat tough will be pulled away from the fibers and the meat will be much more tender than when treated in any other way.

The frame member 13 is similar to member 10, though not identical therewith. It is provided with flanges 17 and 18, as is member 10, but the flanges 18 and the bed plate 23 have holes therein for the reception of the bolts 24 by means of which the guide bolts 25 may be secured in position so that their heads 26 will not be drawn down against the top of plate 13. When the bolts 24 are loosened up, the springs 27 force the frame 28 downwardly and, since the members 25 are secured thereto, they will also go down until their heads 26 strike the plate 23.

The frame 28 consists of spacer blocks 29 and stripper bars 30 mounted on the connecting rods 31 which tie these members together. This stripping frame is for the purpose of holding the meat down so that when the sinew hooks 22 are drawn out of the meat, the latter will not be lifted and then dropped again in the same place so that the hooks would simply reenter the same holes. In the operation of this device, it is important that every one of the sinew pullers shall be entirely freed from the meat each time the machine makes a stroke. The upper frame member 13 is provided with fastening means 19, 20 and 21, as in the case of the lower frame member. This is in order to make it possible to remove the bed plate 23 for cleaning purposes, the same as plate 16. It will be understood that the posts 25 at the front of the machine may or may not be in front of the bed plate 23 but they must not interfere with the removal of this bed plate for cleaning purposes. The bed plate may, therefore, be of such a length and the posts so spaced that the bed plate can slide out between the posts 25, or, as illustrated, the holes through frame member 13 may be large enough to permit the heads of the posts 25 to pass therethrough, bed plate 23 being countersunk to receive said heads.

A lower stripper frame is made up similarly to the upper stripper frame of spacing blocks 29 and bars 32. However, the bars 32 are wider than the bars 30 and are provided on their upper edges with saw teeth 33, as illustrated in Fig. 2. The purpose of these teeth is to insure that the meat will be moved forwardly so as to present a new spot for each hook to penetrate the next time it is advanced.

Guide collars 34 are pinned or otherwise secured to the posts 1 and carry guide means 35 and 36 for the blocks 37 by which the lower stripper frame is carried. The blocks 37 are longitudinally slidable between the guides 35 and 36, as will appear from Figs. 1 and 2. Bell-cranks 38 are pivoted to the frame 2 at 38a and have pivotal connection, as indicated at 39, with the blocks 37. The inner extremity 40 of the bell-crank is engaged by the projection 41 of the slide 11 near the lower end of its course of travel, thus insuring that the bell-crank will rock about its pivot 38a and cause the stripper frame to be advanced with a quick motion when the supporting member 10 approaches the end of its downward motion. At this time the sinew hooks will be withdrawn from the meat and will be below the upper surface of the stripper bars. It will be apparent that since the end of member 38 swings in a short arc, it will be necessary to have a little looseness around the pivot member 39 to permit the slight vertical motion due to the deviation from a straight path. Ears 42 project downwardly from the stripper frame and serve as attaching means whereby the spring 43 may be attached to this frame. Other ears 44 project from the lower faces of blocks 37 for attachment of the other end of these springs. The function of these springs is to return the stripper frame to its normal position ready for the next forward stroke by means of which the meat is again advanced. Guide plates 45 are attached to the collars 34 at the two sides of the machine and serve to prevent the meat from engaging the posts during the operation of the machine.

While I have shown the operating means 38 as a bell-crank lever, it will be understood that various other means may be employed for the operation of the meat-advancing means 32, such, for example, as cams on the shaft 6 engaging projections on the lower stripper frame, or levers mounted at the sides of the machine, connected to or functioning with the stripper frame to actuate the same, and means operating with the frame 10 to cause actuation of the levers whereby to produce reciprocating motion of the stripper frame.

Stated briefly, the operation of the machine is as follows. With the upper and lower sinew hooks separated as far as possible, their points being then located between the stripper bars, the piece of meat to be made tender is placed on the lower stripper bars close to the hooks or with the forward portion inserted part way between the hooks and then the motor is started. As the motor runs, the hooks are alternately brought toward and retracted from each other and then, when the hooks are withdrawn between the stripper bars, the lower bars cause the meat to be advanced somewhat and the hooks are again brought toward each other. This action, which is repeated rapidly, causes the fibers to be broken and part of the sinew to be drawn out to the surface, causing the meat to be rendered very tender.

I have mentioned above the use of sinew hooks both above and below the meat. Such is for use with thin portions of meat, as fillets. For roasts, I prefer to use only the set of hooks above the meat, omitting those below. While I have disclosed this apparatus as comprising an automatic upper stripper plate, I prefer to make this stationary, although of course removable for cleaning purposes.

In order to prevent the user from inserting a hand between the hooks and possibly being severely injured, guard plates may be pivotally mounted in front of the entrance and exit openings and arranged to automatically close same when there is no meat to prevent the user from inserting his hand. The casing which normally encloses the machine, except where the meat is inserted and removed, has not been illustrated as this is a mere enclosing casing and probably adds nothing to the patentability of the structure.

Having now described my invention, I claim:

1. A meat tenderer comprising a member mounted to reciprocate toward and from a piece of meat, means to reciprocate said member, means to support the meat, and sharp pointed, hooked members carried by the reciprocating member to be forced into and withdrawn from the meat, thereby loosening and breaking apart the connective tissue associated with the muscle fibers of the meat.

2. A meat tenderer comprising a frame, a pair of members mounted to reciprocate on said frame toward and from each other, mechanical means to reciprocate said members, moving means to support the meat, and elongated notched members carried by the reciprocating members to be forced into and withdrawn from the meat, thereby loosening and breaking apart the connective tissue associated with the muscular tissue of the meat.

3. A meat tenderer comprising a member mounted to reciprocate toward and from a piece of meat, means to reciprocate said member, means to support the meat, and elongated, pointed, hooked members carried by the reciprocating member to be forced into and withdrawn from the meat, thereby loosening and breaking down the connective tissue associated with the muscle fiber of the meat, the means for supporting the meat comprising spaced bars located at a substantially fixed height.

4. A meat tenderer comprising a member mounted to reciprocate toward and from a piece of meat, means to reciprocate said member, means to support the meat, sharp pointed members carried by the reciprocating member to be forced into and withdrawn from the meat and having hooks projecting away from the points, thereby loosening and breaking down the connective tissue associated with the muscle fibers of the meat, and means for stripping the meat from the notched members.

5. A structure for the purpose stated comprising supporting means, reciprocating supporting members mounted thereon to move toward and from each other, hooked members carried by the supporting members to be carried toward and away from each other and to penetrate a piece of meat placed between the supporting members, and actuating means whereby the supporting members and hooked members may be reciprocated.

6. A structure for the purpose indicated comprising a frame having upright members, supporting elements, slidable longitudinally of the upright members, links connected to the slidable elements to cause reciprocation thereof, and operating means connected to said links to cause the same to reciprocate so that the slidable elements connected to the links will approach and recede from each other, said slidable supporting elements carrying notched members which project toward the opposite supporting element.

7. A structure for the purpose indicated comprising a base member, posts rising from opposite sides of said base member, said posts having channeled supports secured thereto intermediate the ends thereof, a stripper frame mounted in the channels of said supports, means for reciprocating said stripper frame between said posts and transversely thereof, a supporting element mounted on said posts for reciprocation longitudinally thereof, said supporting element being mounted between said base and said stripper frame, and operating mechanism for reciprocating said supporting element toward and away from said stripper frame.

8. A structure for the purpose indicated comprising a base member, posts rising from opposite sides of said base member, said posts having channeled supports secured thereto intermediate the ends thereof, a stripper frame mounted in the channels of said supports, means for reciprocating said stripper frame between said posts and transversely thereof, a supporting element mounted on said posts and reciprocating longitudinally thereof, said supporting element being mounted between the stripper frame and the remote extremities of said posts, and operating means connected to said supporting element for reciprocating the same toward and away from said stripper frame.

9. A meat tenderer comprising a base having upright posts extending upwardly from the base, collars mounted on said posts and fixed thereon, guideways on said collars extending transversely of the posts, arranged on the inner sides of the posts and facing each other, a stripper frame mounted in said guideways to slide therein transversely of the posts, said stripper frame having forwardly directed points on its upper surface to actuate forwardly a piece of meat resting thereon, actuating means for the stripper frame to move the same forwardly with a quick motion, a support carrying sinew hooks to cooperate with the stripper frame in acting upon a piece of meat, said support cooperating with the actuating means for the stripper frame to cause actuation thereof.

10. A structure as defined by claim 9 in which said support carries a holding plate in which the sinew hooks are mounted.

11. A structure for the purpose stated comprising a base, posts rising from said base, a reciprocable frame element movable longitudinally with respect to said posts, said frame element having means whereby it is connected to the posts so as to have slidable motion with relation thereto, said frame element having a sinew hook plate removably connected thereto, a stripper frame carried by said reciprocable frame element, headed pins connecting said stripper frame and said frame element for limited reciprocatory motion with relation to each other, said frame element having openings therein through which the heads of said pins may pass, the sinew hook plate having sockets around the pin openings for the reception of the pin heads so that the pins may be completely detached from the frame element in order to permit removal of the hook plate and stripper frame from the frame element, and mechanism to cause reciprocation of the frame element with respect to the posts.

12. A structure as defined by claim 9 having means to automatically return the stripper element to its normal, initial position, after it has been actuated forwardly and released for return movement.

13. In the art of tendering meat, those steps which comprise supporting the piece of meat to be made tender in a position to be operated upon, inserting elongated hooked members into the meat and withdrawing same therefrom, thus pulling and breaking the connective tissue, and repeating the operation until sufficient of the connective tissue has been broken to make the meat as tender as desired.

14. A structure for the purpose indicated comprising a supporting framework, movable supporting means carried by said frame-work, pointed notched members carried by said movable supporting means, the supporting means being reciprocable and causing reciprocation of the pointed members, the points of the pointed members serving to determine the point of entry thereof and to insure different points of entry at each stroke of the movable supporting means.

15. Meat tendering apparatus comprising supporting and guiding means, oppositely reciprocable carrier members mounted thereon, and a plurality of pointed, elongated, slender members, having barbs protruding laterally from the forward portion thereof, carried by the carrier members, the points of each set of pointed members, being directed toward the other carrier member.

16. A structure as defined by claim 15 in which the pointed end portions of the pointed members overlap a substantial amount in one operative position.

17. A meat tenderer comprising supporting means, movable means slidably carried thereby and reciprocating with respect thereto, carrying members mounted on said movable means, elongated notched members for breaking connective tissue of meat, said notched members being supported by the carrying members, being reciprocated toward and from each other by the actuation of said movable means, having the notches adjacent the ends of the elongated members and having points directed away from the ends of said members.

ANDREW O. RASMUSSEN.